United States Patent Office 2,805,267
Patented Sept. 3, 1957

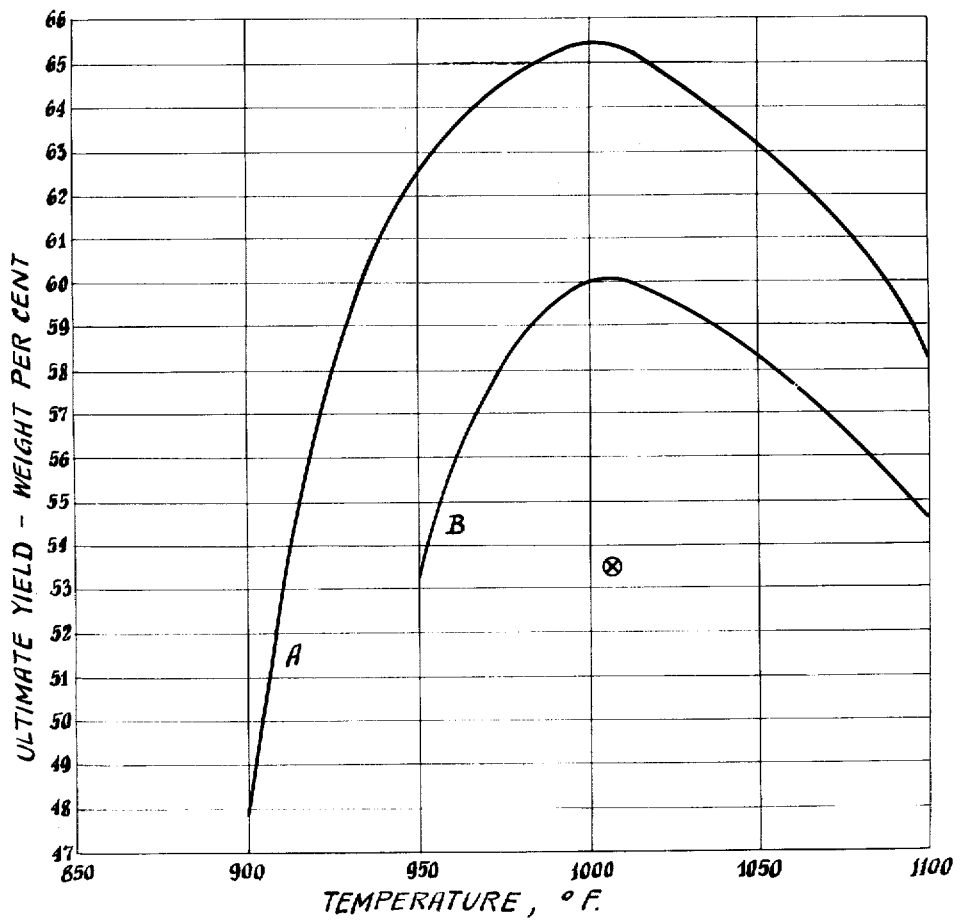

2,805,267

DEMETHYLATION OF AROMATIC HYDROCARBONS

Harry L. Coonradt and Charles J. Plank, Woodbury, and Barton W. Rope, Mullica Hill, N. J., assignors to Socony Mobil Oil Company, Inc., a corporation of New York Application September 16, 1952, Serial No. 309,927

6 Claims. (Cl. 260—672)

This invention relates to the demethylation of methyl-substituted organic compounds. It is more particularly concerned with the catalytic removal of one or more methyl groups from methyl-substituted aromatic hydrocarbons, in the presence of a novel catalyst.

Dealkylation of alkylaromatic compounds has been effected in excellent yields, by many processes well known in the art. As those familiar with the art will appreciate, however, demethylation, as distinguished from dealkylation, has been more difficult of achievement. In order to effect the removal of one or more methyl groups from a methyl-substituted aromatic compound, conditions must be used which differ considerably from those used in dealkylation. For example, in U. S. Patent No. 2,194,449, to Sachanen et al., it has been proposed to demethylate methylnaphthalenes to naphthalene in the presence of a clay type catalyst, at temperatures of between about 800° F. and about 1200° F., temperatures of about 900° F. being preferred. It is significant to note, however, that dealkylation reactions proceed to almost 100 percent yield of dealkylated products. On the other hand, even under the optimum conditions known in the prior art, demethylation reactions have effected much lower yields of demethylated product, i. e., in the neighborhood of around about 55 percent yield.

It has now been found that methyl-substituted aromatic compounds can be demethylated in superior yields, by a process which is simple and commercially feasible. It has been discovered that the removal of one or more methyl groups from a methyl-substituted aromatic hydrocarbon can be effected by contacting the same with a novel catalyst comprising a thin silica-alumina shell overlaying a silica base.

Accordingly, it is an object of the present invention to provide a commercially feasible process for demethylating methyl-substituted aromatic compounds. Another object is to provide a process for achieving the demethylation of methyl-substituted aromatic hydrocarbons in superior yields. A further object is to provide a new catalytic process for demethylating methyl-substituted aromatic hydrocarbons. A specific object is to provide a process for effecting the removal of one or more methyl groups from a methylnaphthalene, in the presence of a novel catalyst. A more specific object is to provide a process for producing naphthalene from methylnaphthalenes in superior yields by contacting the methylnaphthalenes with a catalyst comprising a thin silica-alumina shell overlaying a silica base. Other objects and advantages of the present invention will become apparent to those skilled in the art, from the following detailed description.

The present invention provides a process for demethylating a methyl-substituted aromatic compound, which comprises contacting the methyl-substituted aromatic compound with a catalyst comprising a thin silica-alumina shell overlaying a silica core, at a temperature of between about 900° F. and about 1200° F., and for a period of time of between about one second and about three minutes.

The process of this invention is generally applicable to the demethylation of any methyl-substituted aromatic hydrocarbon, including monomethyl-substituted aromatic hydrocarbons and polymethyl-substituted aromatic hydrocarbons. In the case of the latter compounds, one or more methyl groups can be removed. Thus, for example, a xylene can be demethylated to produce benzene or toluene, dependent upon the extent of demethylation desired. The present process is also applicable to charge stocks containing methyl-substituted aromatic hydrocarbons in admixture with other hydrocarbons, such as highly-aromatic petroleum fractions and the like, as well as to relatively pure methyl-substituted aromatic hydrocarbons. Non-limiting examples of the charge stocks which can be demethylated by the present process are toluene, o-xylene, p-xylene, trimethylbenzenes, α-methylnaphthalene, β-methylnaphthalene, guaiene, 1,4-dimethylnaphthalene, α-methylanthracene, 2,4-dimethylanthracene, 3-methylphenanthrene, and the like; and mixtures thereof.

The catalyst utilized herein is fully described in a co-pending application, Serial Number 256,389, filed November 14, 1951, by Charles J. Plank, now Patent No. 2,746,936, one of the inventors herein. Reference should be made thereto for further details. The base or carrier material for the catalyst is a porous silica gel. This carrier can be in the form of granules of any desired size and shape ordinarily used for catalytic materials. A convenient carrier consists of spherical bead-like particles of silica gel. Such particles can be prepared by any feasible procedure, such as the method described in U. S. Patent No. 2,384,964.

In order to prepare the catalyst used in the process of this invention, the pores of the carrier are first partially filled with a liquid which is chemically unreactive with the silica gel. Suitable liquids are water; liquids having a viscosity of at least about 20 centipoises, as described in U. S. Patent No. 2,456,578; and water-miscible organic liquids set forth in U. S. Patent No. 2,456,577. Non-limiting examples of the liquids are aromatic hydrocarbons, such as, benzene, toluene, xylene, etc.; halogenated organic compounds, such as, carbon tetrachloride, chlorobenzenes, etc.; alcohols, such as methanol, ethanol, pentanol, glycol, gylcerine, etc.; ketones, such as, acetone, methylethyl ketone, etc.; aldehydes, such as, acetaldehyde, etc.; ethers, such as, ethyl ether, etc.; nitrated compounds, such as, nitrobenzene; heterocyclic compounds, such as, furan, thiophene, etc.; and derivatives thereof.

It is to be noted that the pore-filling operation is purely a physical one. The liquids do not react, chemically, with the silica gel. The partial filling of the pores can be accomplished by several methods. The carrier can be immersed in the liquid for a period of time which is limited so as to effect partial filling. Alternatively, knowing the pore size and the amount of carrier, a measured amount of liquid just sufficient to effect the desired partial filling of the pores can be used. By another method, the carrier can be completely saturated with the liquid, and subsequently subjected to vacuum, so as to remove part of the liquid. If undried silica gel is used, it can be subjected to vacuum to effect the same result of partial pore filling, without first drying the wet silica gel. The extent to which the pores are filled, of course, will depend upon the desired depth of the surface coating or shell, as will become apparent hereinafter.

After the pores of the silica gel are partially filled, the silica gel is impregnated with a solution of an aluminum salt capable of being converted to alumina by calcination. If desired, the impregnated carrier can be further treated with a basic solution, such as, NH4OH or NaOH solutions, to precipitate aluminum hydroxide in the surface pores. The solvent for the aluminum salt can be the same liquid used for partially filling the pores or it can be different therefrom. In fact, the degree of miscibility of the two liquids is determinative of the next step in preparing the catalyst.

As will be recognized, the unfinished catalyst, at this point, consists of a silica gel carrier having the inner portion of its pores filled with an inert liquid, and having the outer, or surface, portions of its pores filled with a solution of an aluminum salt or with a suspension of aluminum hydroxide.

The wet, impregnated catalyst is then dried, at temperatures of about 200°–500° F., to remove the solvents and liquids used to partially fill the pores. When the solvent for the aluminum salt and the filling liquid are substantially immiscible, drying need not be rapid. If, however, the two liquids are miscible, or the same liquids (which is often the case), drying should be effected as quickly as possible. Otherwise, the aluminum salt may migrate or diffuse towards the center of the carrier, thus destroying the desired concentration of aluminum salt near the surface of the carrier. The dried catalyst is then calcined, suitably at temperatures of between about 800° F. and about 1400° F.

The finished catalyst, produced as described briefly herein and in more detail in the Plank application, supra, consists of a center or core of silica covered with a thin layer or shell of silica-alumina. The thickness of this shell will depend upon the depth of impregnation. In other words, it depends upon the amount of the pore volume which is not filled with liquid during the initial step in preparing the catalyst. In the interests of brevity, this catalyst is hereinafter referred to as an egg-shell catalyst, so-called because of the resemblance of the catalyst shell to the shell of an egg. The egg-shell catalyst herein described is to be distinguished from the coprecipitated alumina-silica catalysts and from the silica catalysts which have been impregnated with alumina to the full depth of the pores.

The process of this invention is effected by contacting the methyl-substituted aromatic compound charge material with the aforedescribed egg-shell catalyst, at elevated temperatures, for a relatively short period of time, in any vessel suitable for carrying out catalytic reactions, and having provision for heat input to maintain catalyst temperature. The process, of course, can be performed in a batch process. Preferably, however, a continuous operation is used. In such an operation, the charge is passed through the reactor in contact with the catalyst. Then the reaction product is subjected to a product separation operation. The portion of the charge stock which remains undemethylated and/or which is incompletely demethylated (as with polymethyl charge materials) can be recycled to the reactor, until the maximum ultimate conversion has been effected.

The temperature of the egg-shell catalyst is maintained at between about 900° F. and about 1200° F., preferably, between about 950° F. and about 1050° F. The contact time is dependent upon the temperature and upon the nature of the reactants. In general, the contact time varies inversely with the temperature, and beween about one second and about three minutes.

The present process can be carried out at any pressure, subatmospheric, atmospheric, or superatmospheric. At elevated temperatures and pressures, however, coking becomes more pronounced. Accordingly, it is preferred to operate under atmospheric pressure, or at pressures slightly below atmospheric pressure. Advantageous results can be obtained when hydrogen gas is added to the reaction vessel. It is desirable to use hydrogen under pressure. Accordingly, superatmospheric pressures are most advantageous when operating in the presence of added hydrogen gas.

The following examples are for the purpose of demonstrating the process of the present invention and the superiority thereof. It must be strictly understood that this invention is not to be limited by the reactants and conditions used in the examples, or by the operations and manipulations involved therein. As will be apparent to those skilled in the art, other reactants and conditions, as set forth hereinbefore, can be used to practice this invention.

APPARATUS AND OPERATION

The reactor used in the runs described in the examples was a stainless steel tube suspended in a bath of molten lead. The temperature of the lead was controlled to maintain the catalyst temperature constant to within about 10° F. Catalyst temperature was measured by means of thermocouples extending into the top, middle, and bottom portions of the catalyst bed. A total volume of about 150 cubic centimeters of catalyst was placed in the reactor. Accessory equipment included a heated, thermostatically controlled burette for measuring the charge, pumps, preheater coils, a condensing and collecting system for aromatic and gaseous products, and a system for determining the amount of coke on the catalyst by a combustion method.

In operation, the catalyst, at operating temperature, was purged with nitrogen gas; followed by a flushing with hydrogen when used in the run. Then, the charge material, in the liquid state, together with added gases or liquids, was passed through a preheater to raise the temperature thereof to the reaction temperature. The combined charge was then passed downwardly through the catalyst bed at a rate sufficient to effect the desired contact time. A sample of the total gas collected was analyzed in the mass spectrometer to determine its composition and the weight of the components. The principal component was methane.

The amount of coke laid down on the catalyst was determined by combustion methods, i. e., by converting it to carbon dioxide and analyzing therefor. The aromatic products were distilled on a column having 15 theoretical plates. The amounts of the aromatic hydrocarbons in the product were determined by (1) fractionation, or (2) by ultraviolet absorption analysis.

RUNS USING $SiO_2$—$Al_2O_3$ CRACKING CATALYST

Examples 1 through 13

A series of runs were made using a silica-alumina bead cracking catalyst prepared as described in U. S. Patent No. 2,384,946. This catalyst had an activity index (a measure of catalytic activity determined by testing in a Cat–A unit using the method set forth by Alexander and Shimp, National Petroleum News, vol. 36, P. R.–537, August 2, 1944) of about 42. The charge stock used throughout these runs was 2-methylnaphthalene. Several runs were made at each temperature, namely, 950° F., 1000° F., and 1100° F. Pertinent data and results for these runs are set forth in Table I.

Example 14

A portion of bead cracking catalyst, as used in the preceding examples, was steam treated. This treatment lowered the activity index of the catalyst from about 42 to about 35. A run was made using this catalyst and 2-methylnaphthalene. Pertinent data and results therefor are set forth in Table I. In Table II are summarized the average data for conversion from methylnaphthalene to naphthalene under various conditions, as more fully set forth in Table I.

TABLE I.—DEMETHYLATION OF METHYLNAPHTHALENE SILICA-ALUMINA BEAD CATALYSTS [a]

| Example | Charge Stock [b] | | Temp., °F. | Length of Run, Min. | Methyl-naphtha-lene L. H.S.V.[d] | Contact Time, Sec.[e] | Yield of Products, Weight Percent Per Pass | | | | | Yield of Products [f] Ultimate Weight Percent | | |
|---|---|---|---|---|---|---|---|---|---|---|---|---|---|---|
| | G. | G./Min. | | | | | Naphtha-lene | Resi-due | Coke | Gas | Total | Naphtha-lene | Coke | Gas |
| 1 | 48.6 | 1.97 | 950 | 24.6 | 0.803 | 10.1 | 9.1 | 79.9 | 6.0 | 0.8 | 95.7 | 57.2 | 37.8 | 5.0 |
| 2 | 48.4 | 2.0 | 950 | 24.2 | 0.812 | 10.0 | 7.9 | 82.4 | 6.6 | 0.8 | 97.7 | 51.7 | 43.1 | 5.2 |
| 3 | 48.4 | 2.0 | 950 | 24.2 | 0.810 | 10.0 | 10.7 | 76.2 | 7.0 | 0.8 | 94.8 | 57.8 | 37.9 | 4.3 |
| 4 | c 48.5 | 1.93 | 1,000 | 25.1 | 0.785 | 10.0 | 15.5 | 72.7 | 8.3 | 1.2 | 97.6 | 62.0 | 33.2 | 4.8 |
| 5 | 48.3 | 1.92 | 1,000 | 25.2 | 0.779 | 10.2 | 14.1 | 73.3 | 7.7 | 1.4 | 96.5 | 60.8 | 33.2 | 6.0 |
| 6 | 48.4 | 1.93 | 1,000 | 25.1 | 0.784 | 10.0 | 16.3 | 71.5 | 9.5 | 1.2 | 98.5 | 60.4 | 35.2 | 4.4 |
| 7 | 48.4 | 1.92 | 1,000 | 25.2 | 0.779 | 10.1 | 14.5 | 70.9 | 8.9 | 1.4 | 95.7 | 58.5 | 35.9 | 5.6 |
| 8 | 99.0 | 1.93 | 1,000 | 51.3 | 0.800 | 10.0 | 13.0 | 75.3 | 6.8 | 1.4 | 96.5 | 61.3 | 32.0 | 6.7 |
| 9 | 98.6 | 1.93 | 1,000 | 51.1 | 0.784 | 10.0 | 11.8 | 79.0 | 7.0 | 1.3 | 99.7 | 58.7 | 34.8 | 6.5 |
| 10 | c 48.4 | 1.80 | 1,100 | 26.8 | 0.732 | 10.0 | 21.5 | 58.3 | 14.2 | 3.1 | 97.1 | 55.3 | 36.7 | 8.0 |
| 11 | 48.5 | 1.81 | 1,100 | 26.8 | 0.735 | 9.9 | 23.5 | 53.8 | 15.9 | 3.1 | 96.3 | 55.3 | 37.4 | 7.3 |
| 12 | 48.7 | 1.81 | 1,100 | 26.7 | 0.735 | 10.0 | 20.0 | 57.2 | 15.5 | 1.4 | 94.2 | 54.2 | 42.0 | 3.8 |
| 13 | 98.2 | 1.79 | 1,100 | 54.9 | 0.725 | 10.1 | 19.0 | 61.7 | 12.9 | 3.2 | 96.8 | 54.1 | 36.8 | 9.1 |
| 14 g | 98.6 | 1.93 | 1,000 | 51.2 | 0.780 | 10.0 | 10.1 | | 7.8 | 1.0 | | 53.5 | 41.2 | 5.3 | a Bead cracking catalyst of 42 A.I.—fresh dried (10.1 wt. percent Al₂O₃) unless otherwise stated. Volume of catalyst—150 cc.
b 2-methylnaphthalene—Ultraviolet absorption analysis indicated 99.4% purity.
c 2-methylnaphthalene—Eastman practical.
d Volume 2-methylnaphthalene charge at 50° C./vol. catalyst/hour.
e Based on total charge to reactor and assuming 150 cc. of voids.
f Based on ratios of naphthalene, coke and gas.
g Bead cracking catalyst steam treated to 35.3 A.I.

TABLE II.—DEMETHYLATION OF METHYLNAPHTHALENE [a] SILICA-ALUMINA BEAD CATALYST, YIELD OF NAPHTHALENE

| Catalyst Activity Index | Temp., °F. | Yield of Naphthalene | |
|---|---|---|---|
| | | Weight Percent Per Pass | Ultimate Weight, percent |
| 42 | 950 | 9.2 | 53.6 |
| 42 | 1,000 | 14.2 | 60.1 |
| 42 | 1,100 | 21.0 | 54.7 |
| 35 | 1,000 | 10.1 | 53.5 | a Average values from experiments under similar conditions as listed in Table I.

Examples 16 and 17

Two runs were made in which 2-methylnaphthalene was charged to the reactor containing the egg-shell catalyst described in Example 15, at 1000° F. catalyst temperature. In each run, all conditions were maintained identical, in order to demonstrate the reproducibility of results. Pertinent data and results for these runs are set forth in Table III.

Examples 18 and 19

Runs were made, using the same reactant and catalyst as in Examples 16 and 17, except that the temperatures employed were 1100° F. and 900° F., respectively. Pertinent data and results therefor are set forth in Table III.

TABLE III.—DEMETHYLATION OF METHYLNAPHTHALENE EGG-SHELL CATALYST [a]

| Example | Charge Stock [b] | | Temp., °F. | Length of Run, Min. | Methyl-naphtha-lene L. H.S.V.[c] | Contact Time, Sec.[d] | Yield of Products [e] Weight Percent Per Pass | | | | | Yield of Products [e,f] Ultimate Weight Percent | | |
|---|---|---|---|---|---|---|---|---|---|---|---|---|---|---|
| | G. | G./Min. | | | | | Naphtha-lene | Resi-due | Coke | Gas | Total | Naphtha-lene | Coke | Gas |
| 16 | 98.6 | 1.93 | 1,000 | 51.2 | 0.781 | 10.0 | 8.8 | 85.4 | 4.1 | 0.4 | 98.7 | 66.4 | 30.5 | 3.1 |
| 17 | 98.7 | 1.93 | 1,000 | 51.2 | 0.782 | 10.0 | 8.2 | 86.3 | 4.2 | 0.4 | 99.1 | 64.3 | 32.5 | 3.2 |
| 18 | 98.6 | 1.79 | 1,100 | 55.0 | 0.727 | 10.0 | 14.7 | 74.2 | 9.0 | 1.3 | 99.2 | 58.7 | 36.0 | 5.3 |
| 19 | 98.6 | 2.075 | 900 | 47.5 | 0.842 | 10.0 | 2.5 | 95.4 | 2.6 | 0.1 | 100.6 | 48.1 | 50.0 | 1.9 | a Egg-shell catalyst, 31.6 A.I.
b 2-methylnaphthalene—Reilly (purified; ultraviolet analysis indicated 99.4% purity).
c Volume of 2-methylnaphthalene at 50° C./vol. catalyst/hour.
d Based on total charge to reactor and assuming 150 cc. of voids.
e Both yield per pass and ultimate yield are expressed as weight percent of methylnaphthalene charged.
f Based on ratios of naphthalene, coke and gas.

RUNS USING THE EGG-SHELL CATALYST

Example 15

A catalyst was prepared from silica hydrogel beads produced by the method described in U. S. Patent No. 2,384,946, at a pH of 7.0. Three and one half liters of the silica hydrogel were aged for 15 hours at 42–50° F. Then, the hydrogel beads were treated with sulfuric acid and subsequently washed free of sulfate ion. The wet, washed beads were impregnated with aluminum nitrate by immersing them, for fifteen minutes, in a 10 percent aqueous solution of aluminum nitrate nonahydrate. Thereafter, the beads were dried overnight at about 280° F., and then calcined overnight at 1000° F. The catalyst, thus prepared, consisted essentially of a shell of alumina-silica over a core of silica. It had a bulk density of 0.80 and an activity index of about 32.

The foregoing examples demonstrate the superiority of the process of the present invention. It is recognized that the yield per pass using the egg-shell catalyst is somewhat less than when the silica-alumina cracking catalyst is used. Due to less coking and gaseous degradation products, however, the ultimate yields are markedly higher, when using the egg-shell catalyst. This superiority is more remarkable when it is borne in mind that the catalyst activity index of the silica-alumina catalyst used in Examples 1 through 13 was greater than that of the egg-shell catalyst used in Examples 16 through 18.

In the figure attached hereto, the curves compare graphically the relationship between the ultimate yield of naphthalene from methylnaphthalene and catalyst temperature, for each catalyst; other conditions remaining constant. The curves are based upon the data set forth in Tables I, II, and III, for runs made in the same reactor for a contact time of about 10 seconds. It will be noted that the maximum ultimate yield obtained with the egg-shell catalyst of 32 activity index (Curve A), under optimum conditions, was about 66 percent, based on the weight of methylnaphthalene charged. The maximum ultimate yield obtained with the silica-alumina catalyst (Curve B) was about 61 weight percent, using the more active catalyst of 42 activity index. Using a silica-alumina catalyst of lower activity index (Example 14), which is more comparable to that of the egg-shell catalyst, the maximum yield was about 54 weight percent (Point ⊗). Thus, it will be apparent that under similar conditions of contact time, temperature, and catalyst activity index, the process of the present invention effects almost 25 percent greater yield than was obtained with the silica-alumina catalyst.

The products produced by the process of this invention have many uses well known to those skilled in the art. Thus, benzene is used as a solvent and as an intermediate for preparing chlorinated benzene insecticides, phenol, etc. Many halo compounds, cresols, and benzyl compounds are produced from toluene. Naphthalene is a well known larvicide, and an intermediate for the production of phthalic anhydride by oxidation thereof. Methylphthalic anhydrides are produced from methylnaphthalenes.

Although the present invention has been described with preferred embodiments, it is to be understood that modifications and variations can be resorted to without departing from the spirit and scope of this invention, as those skilled in the art will readily understand. Such variations and modifications are considered to be within the scope and purview of the appended claims.

What is claimed is:

1. A process for demethylating a methyl-substituted aromatic compound, which comprises contacting the methyl-substituted aromatic compound with a catalyst comprising a thin silica-alumina shell overlaying a silica core, at a temperature of between about 900° F. and about 1200° F., and for a period of time of between about one second and about three minutes; said catalyst being produced by partially filling the pores of a porous silica gel with a liquid which is chemically unreactive with said silica gel, impregnating said silica gel having the pores thereof thus partially filled, with an aqueous solution of an aluminum salt, drying the thus-impregnated silica gel and calcining the dried, impregnated silica gel.

2. A process for demethylating a monomethyl-substituted aromatic hydrocarbon, which comprises contacting said aromatic hydrocarbon with a catalyst comprising a thin silica-alumina shell overlaying a silica core, at a temperature of between about 900° F. and about 1200° F., and for a period of time of between about one second and about three minutes; said catalyst being produced by partially filling the pores of a porous silica gel with a liquid which is chemically unreactive with said silica gel, impregnating said silica gel having the pores thereof thus partially filled, with an aqueous solution of an aluminum salt, drying the thus-impregnated silica gel and calcining the dried, impregnated silica gel.

3. A method for producing naphthalene from a methylnaphthalene, which comprises contacting said methylnaphthalene with a catalyst comprising a thin silica-alumina shell overlaying a silica core, at a temperature of between about 900° F. and about 1200° F., and for a period of time of between about one second and about three minutes; said catalyst being produced by partially filling the pores of a porous silica gel with a liquid which is chemically unreactive with said silica gel, impregnating said silica gel having the pores thereof thus partially filled, with an aqueous solution of an aluminum salt, drying the thus-impregnated silica gel and calcining the dried, impregnated silica gel.

4. A continuous process for producing naphthalene from a methylnaphthalene, which comprises contacting said methylnaphthalene with a catalyst comprising a thin silica-alumina shell overlaying a silica core, at a temperature of between about 950° F. and about 1050° F., for a period of time of between about one second and about three minutes; separating the naphthalene from undemethylated methylnaphthalene; and recycling said undemethylated methylnaphthalene; said catalyst being produced by partially filling the pores of a porous silica gel with a liquid which is chemically unreactive with said silica gel, impregnating said silica gel having the pores thereof thus partially filled, with an aqueous solution of an aluminum salt, drying the thus-impregnated silica gel and calcining the dried, impregnated silica gel.

5. A process for producing naphthalene from 2-methylnaphthalene, which comprises contacting said 2-methylnaphthalene with a catalyst comprising a thin silica-alumina shell overlaying a silica core, at a temperature of between about 950° F. and about 1050° F., and for a period of time of between about one second and about three minutes; said catalyst being produced by partially filling the pores of a porous silica gel with a liquid which is chemically unreactive with said silica gel, impregnating said silica gel having the pores thereof thus partially filled, with an aqueous solution of an aluminum salt, drying the thus-impregnated silica gel and calcining the dried, impregnated silica gel.

6. A process for producing naphthalene from 2-methylnaphthalene, which comprises contacting said 2-methylnaphthalene with a catalyst comprising a thin silica-alumina shell overlaying a silica core, at a temperature of about 1000° F., and for about ten seconds; said catalyst being produced by partially filling the pores of a porous silica gel with a liquid which is chemically unreactive with said silica gel, impregnating said silica gel having the pores thereof thus partially filled, with an aqueous solution of an aluminum salt, drying the thus-impregnated silica gel and calcining the dried, impregnated silica gel.

References Cited in the file of this patent

UNITED STATES PATENTS

| | | |
|---|---|---|
| 2,194,449 | Sachanen et al. | Mar. 19, 1940 |
| 2,211,208 | Ipatieff et al. | Aug. 13, 1940 |
| 2,280,649 | Kanhofer | Apr. 21, 1942 |
| 2,380,279 | Welty | July 10, 1945 |
| 2,384,942 | Marisic | Sept. 18, 1945 |
| 2,606,159 | Owen | Aug. 5, 1952 |
| 2,746,936 | Plank | May 22, 1956 |
| 2,750,432 | Coonradt et al. | June 12, 1956 |

OTHER REFERENCES

Thomas: J. A. C. S., vol. 66, pages 1694–6 (1944).
Sachanen: Conversion of Petroleum, 2nd edition, page 88, published by Reinhold Pub. Cor., New York, N. Y. (1948).

UNITED STATES PATENT OFFICE

CERTIFICATE OF CORRECTION

Patent No. 2,805,267 September 3, 1957

Harry L. Coonradt et al.

It is hereby certified that error appears in the printed specification of the above numbered patent requiring correction and that the said Letters Patent should read as corrected below.

Column 2, line 36, for the patent number "2,384,964" read -- 2,384,946 --; column 3, line 67, for "beween" read -- between --; column 6, line 60, for "preent" read -- present --.

Signed and sealed this 29th day of October 1957.

(SEAL)
Attest:
KARL H. AXLINE
Attesting Officer

ROBERT C. WATSON
Commissioner of Patents